US012388778B2

(12) United States Patent
Pitio (10) Patent No.: US 12,388,778 B2
(45) Date of Patent: *Aug. 12, 2025

(54) SYSTEM AND METHODS FOR MESSAGE REDUNDANCY

(71) Applicant: ROYAL BANK OF CANADA, Toronto (CA)

(72) Inventor: Walter Michael Pitio, Morganville, NJ (US)

(73) Assignee: ROYAL BANK OF CANADA, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,941

(22) Filed: Jun. 5, 2023

(65) Prior Publication Data

US 2023/0319006 A1  Oct. 5, 2023

Related U.S. Application Data

(63) Continuation of application No. 15/074,113, filed on Mar. 18, 2016, now Pat. No. 11,671,396.

(Continued)

(51) Int. Cl.
*H04L 51/23* (2022.01)
*H04L 43/0817* (2022.01)
(Continued)

(52) U.S. Cl.
CPC .............. *H04L 51/23* (2022.05); *H04L 43/12* (2013.01); *H04L 51/234* (2022.05);
(Continued)

(58) Field of Classification Search
CPC ....... H04L 43/12; H04L 51/23; H04L 51/234; H04L 43/087; H04L 43/0817; H04L 43/10

See application file for complete search history.

(56) References Cited

U.S. PATENT DOCUMENTS

| 4,809,362 A | 2/1989 | Claus ................. H04J 14/0227 370/407 |
| 6,098,155 A | 8/2000 | Chong, Jr. |

(Continued)

FOREIGN PATENT DOCUMENTS

| GB | 2515501 A | 12/2014 |
| WO | 2004056043 A1 | 7/2004 |

OTHER PUBLICATIONS

United States Patent & Trademark Office (USPTO), Non-Final Rejection to U.S. Appl. No. 15/074,113, filed Dec. 27, 2017.

(Continued)

*Primary Examiner* — Oussama Roudani
(74) *Attorney, Agent, or Firm* — Norton Rose Fulbright Canada LLP (57) ABSTRACT

Systems, methods, and devices for communication are described. A communication system includes a first communication device configured to communicate with a backup device and a destination; and a first tapping device for monitoring messages sent over a first communication link between the first communication device and the backup device. The first communication device includes at least one processor configured to: before sending a first message destined for the destination, send a backup message corresponding to the first message over the communication link for backup at the backup device; and upon confirmation of a tap copy of the backup message from the first tapping device, send the first message to the destination.

37 Claims, 4 Drawing Sheets

Related U.S. Application Data (60) Provisional application No. 62/136,164, filed on Mar. 20, 2015.

(51) Int. Cl.
*H04L 43/087* (2022.01)
*H04L 43/10* (2022.01)
*H04L 43/12* (2022.01)
*H04L 51/234* (2022.01)

(52) U.S. Cl.
CPC ........ *H04L 43/0817* (2013.01); *H04L 43/087* (2013.01); *H04L 43/10* (2013.01)

(56) References Cited

U.S. PATENT DOCUMENTS

| | | | |
|---|---|---|---|
| 6,643,267 B1 | 11/2003 | Karia | H04L 43/0852 370/252 |
| 6,757,248 B1 | 6/2004 | Li | H04L 1/188 370/235 |
| 8,131,967 B2 | 3/2012 | Lemke | G06F 13/4059 711/167 |
| 8,489,670 B1 | 7/2013 | Fletcher | H04L 69/16 709/203 |
| 8,682,954 B2 | 3/2014 | Harpaz | G06F 11/2041 709/219 |
| 9,397,881 B1 | 7/2016 | Fritz | H04L 41/0663 |
| 10,362,131 B1 | 7/2019 | Robbins | G06F 11/2041 |
| 10,455,041 B2 | 10/2019 | Nigam | H04L 67/1008 |
| 2002/0064132 A1 | 5/2002 | Akyol | H04L 41/0803 370/254 |
| 2003/0031175 A1 | 2/2003 | Hayashi | H04L 1/1809 370/390 |
| 2006/0092933 A1 | 5/2006 | Astley | H04L 67/2814 370/389 |
| 2007/0064917 A1 | 3/2007 | Matityahu et al. | |
| 2008/0002694 A1* | 1/2008 | Brahmaroutu | G06F 11/1456 370/392 |
| 2009/0204981 A1 | 8/2009 | Karino | G06F 11/2097 719/328 |
| 2009/0233625 A1 | 9/2009 | Ferguson | H04W 64/00 455/456.5 |
| 2011/0184913 A1 | 7/2011 | Hayden | G06F 11/2097 707/652 |
| 2011/0235503 A1 | 9/2011 | Chen | H04L 41/0846 370/219 |
| 2012/0215854 A1* | 8/2012 | Keast | H04L 51/224 709/206 |
| 2013/0208630 A1 | 8/2013 | Bobrek | H04L 67/12 370/276 |
| 2013/0304809 A1 | 11/2013 | Fletcher | H04L 69/161 709/203 |
| 2013/0304892 A1 | 11/2013 | Afergan | H04L 67/01 709/223 |
| 2013/0340100 A1* | 12/2013 | Moskowitz | H04L 65/61 726/30 |
| 2014/0073357 A1* | 3/2014 | Johnson | G06Q 30/02 455/456.3 |
| 2014/0215280 A1 | 7/2014 | Li et al. | |
| 2014/0330976 A1* | 11/2014 | van Bemmel | H04L 67/1001 709/226 |
| 2015/0012494 A1 | 1/2015 | Jewell | |
| 2015/0237121 A1 | 8/2015 | Nigam | H04L 67/1008 709/204 |
| 2016/0078068 A1 | 3/2016 | Agrawal | G06F 16/174 707/692 |
| 2017/0230326 A1 | 8/2017 | Eidelson | H04L 51/046 |
| 2018/0183832 A1 | 6/2018 | Chang | H04L 63/1416 |
| 2019/0089791 A1 | 3/2019 | Hammer | H04M 15/41 |
| 2019/0182570 A1 | 6/2019 | Hushchyn | H04B 10/2507 |
| 2019/0288960 A1 | 9/2019 | Huang | H04L 49/201 |
| 2020/0014566 A1 | 1/2020 | Ahmed | H04B 10/61 |
| 2020/0195530 A1 | 6/2020 | Pang | H04L 43/026 |

OTHER PUBLICATIONS

United States Patent & Trademark Office (USPTO), Final Rejection to U.S. Appl. No. 15/074,113, filed Sep. 4, 2018.
United States Patent & Trademark Office (USPTO), Final Rejection to U.S. Appl. No. 15/074,113, filed Nov. 18, 2021.
United States Patent & Trademark Office (USPTO), Final Rejection to U.S. Appl. No. 15/074,113, filed Apr. 29, 2020.
United States Patent & Trademark Office (USPTO), Non-Final Rejection to U.S. Appl. No. 15/074,113, filed Dec. 24, 2020.
Canadian Intellectual Property Office, Office Action for Application CA 2,980,196 dated Jan. 30, 2024.
Supplementary European Search Report issued in European Application No. 16767574, dated Aug. 6, 2018.
WIPO, International Search Report and Written Opinion for PCT Application No. PCT/CA2016/050306 dated May 13, 2016.

* cited by examiner

SYSTEM AND METHODS FOR MESSAGE REDUNDANCY

CROSS-REFERENCE TO RELATED APPLICATIONS

This application is a continuation of U.S. Ser. No. 15/074,113 filed on Mar. 18, 2016, which claims all benefit, including priority to U.S. Provisional Patent Application No. 62/136,164, filed Mar. 20, 2015, and entitled "SYSTEM AND METHODS FOR MESSAGE REDUNDANCY", the entirety of which is hereby incorporated by reference.

FIELD

The present disclosure relates generally to data redundancy and particularly to systems, methods, devices and computer-readable media for the redundancy in data to be communicated over communication links or networks.

BACKGROUND

In certain industries, systems may be required to transmit information to another device or location with a high degree of certainty. Backup systems and networks have been used to increase the chances of a loss-less recovery.

SUMMARY

In an aspect, there is provided a communication system. The communication system includes a first communication device configured to communicate with a backup device and a destination; and a first tapping device for monitoring messages sent over a first communication link between the first communication device and the backup device. The first communication device includes at least one processor configured to: before sending a first message destined for the destination, send a backup message corresponding to the first message over the communication link for backup at the backup device; and upon confirmation of a tap copy of the backup message from the first tapping device, send the first message to the destination.

In another aspect, there is provided a communication device. The communication device includes at least one processor configured to: before sending a first message destined for a destination, send a backup message corresponding to the first message over a communication link for backup at a backup device; and upon confirmation of a tap copy of the backup message from a tapping device on the communication link, send the first message to the destination.

In another aspect, there is provided a communication method. The method includes: before sending, from a communication device, a first message destined for a destination, sending a backup message corresponding to the first message from the communication device to a backup device over a communication link; and upon confirmation of a tap copy of the backup message from a tapping device on the communication link, send the first message to the destination.

Many further features and combinations thereof concerning the present improvements will appear to those skilled in the art following a reading of the present disclosure.

DESCRIPTION OF THE FIGURES

Reference will now be made to the drawings, which show by way of example embodiments of the present disclosure.

DESCRIPTION OF EXAMPLE EMBODIMENTS

In a data-driven world, reliability can be an important aspect of data communication systems. In some embodiments, backup systems for storage or redundant communication can be used to ensure a high degree of certainty that a data message will be transmitted, stored, and/or processed and/or will otherwise persist in some form and/or location.

Figure 1:
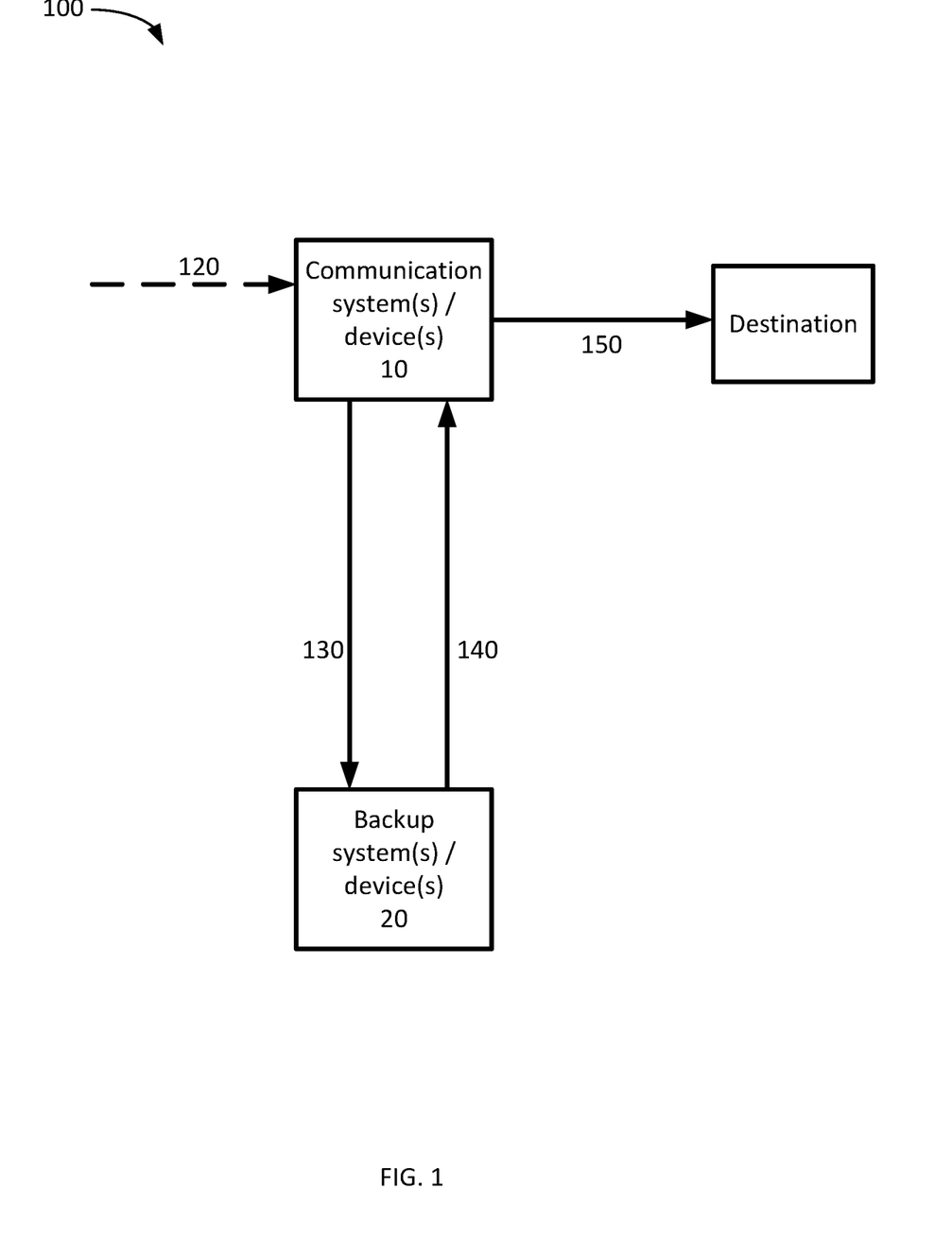
FIGS. 1, 2 and 3 show aspects of example systems and example communication flows in accordance with various aspects of the disclosure.

FIG. 1 shows aspects of an example system 100 and flowchart illustrating a backup process. The system includes one or more communication device(s) and/or system(s) 10 for communicating messages to a destination.

At 120, the communication device(s) 10 may optionally receive instructions and/or data for transmission to a destination. In some examples, the communication device(s) 10 may generate the instructions/data itself or may translate, re-package or otherwise manipulate received instructions/data for transmission.

With a message including the received/generated instructions and/or data, the communication device(s) 10 can be configured to send 130 a backup copy of the message to a backup system/device 20.

Upon receiving the backup copy, the backup system/device 20 can be configured to verify, store and/or otherwise process the backup copy and at 140, send an acknowledgement message back to the communication device(s) 10. In some embodiments, the acknowledgement message includes an identifier (e.g. a sequence number), a portion, or some indication of the backup message to which the acknowledgement relates.

Upon receipt of the acknowledgement message, the communication device(s) 10 can, at 150, send the message to the destination. In this manner, before sending the message to the destination, the system ensures that a backup copy exists in the event there is a failure of the communication device(s) 10.

In some embodiments, the system 100 above may cause a delay between the time data/instructions are received (120) or generated, and the time the message is sent 150 to the destination. In some examples, the delay may include latencies cause by creating the backup message, the transmission latency of sending 130 the backup message from the communication device(s) 10 to the backup system 20, the execution latency for the backup system 20 to process the backup message, the latency of sending 140 the acknowledgement message from the backup system 20 to the communication device(s) 10, and the execution latency for the communication device(s) 10 to process the acknowledgement. While, in some examples, the execution latencies may be small, the transmission latencies (e.g. 130, 140) may be significant depending on the physical distance between the communication device(s) 10 and the backup system 20.

The total delay/latency required to create a backup may negatively impact the performance of the system 100. In some situations, such as those involving time-sensitive communications, these delays are undesirable and may be unacceptable.

In some examples, the backup system 20 may be in a remote location to ensure that a regional catastrophe does not disable or cause a failure of both the primary communication device(s) 10 and the backup device(s) 20. However, the greater distances of remote locations may exasperate the transmission latencies.

Figure 2:
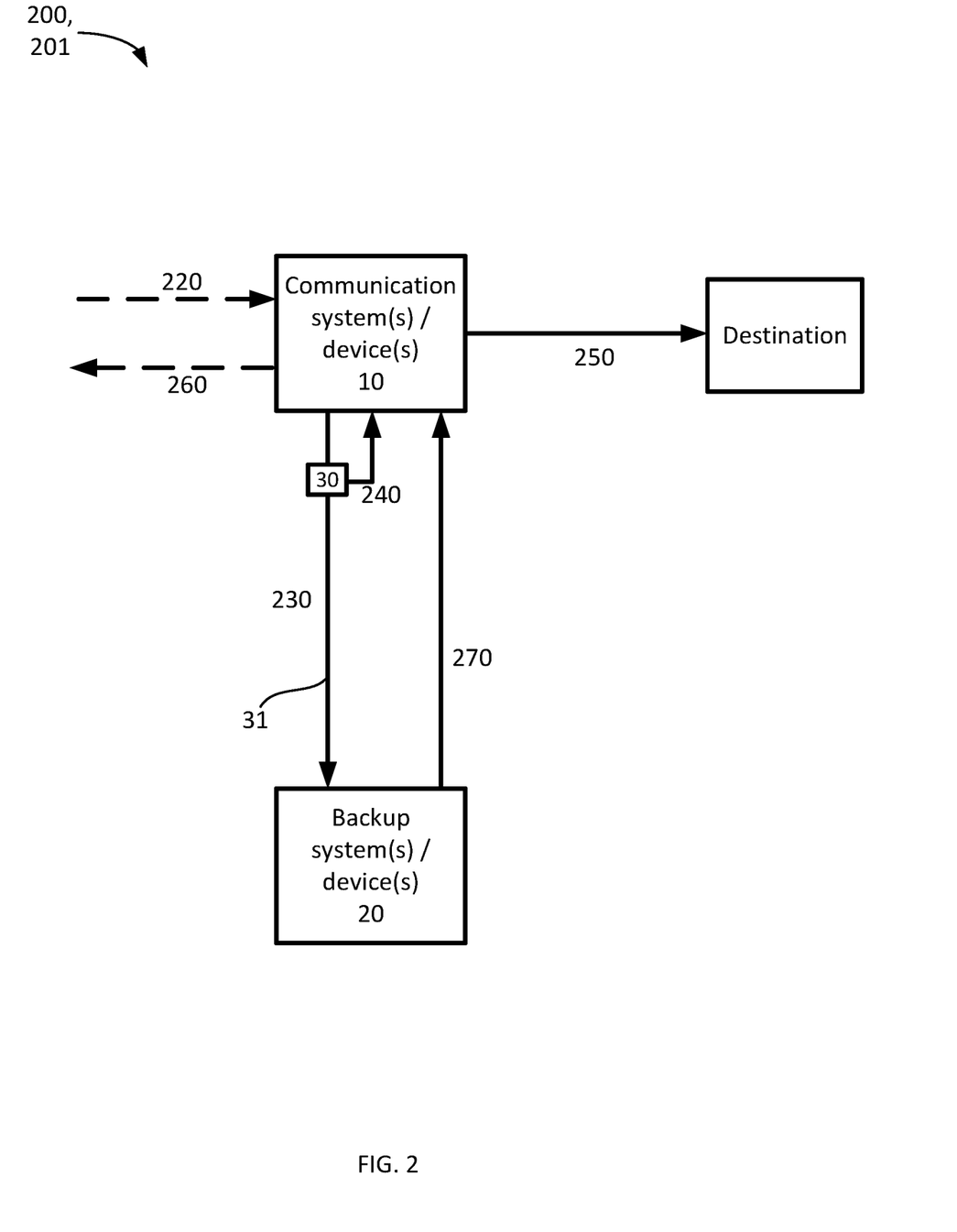

FIG. 2 shows aspects of another example system 200, and flowchart 201 illustrating an example communication process.

The communication device 10 can be a device configured for data communication with a backup system/device 20 and a destination. In some embodiments, the communication device 10 can be a router, switch or other device configured to receive data and/or instructions from another device or system for communicating with the backup system/device 20 and the destination.

Figure 4:
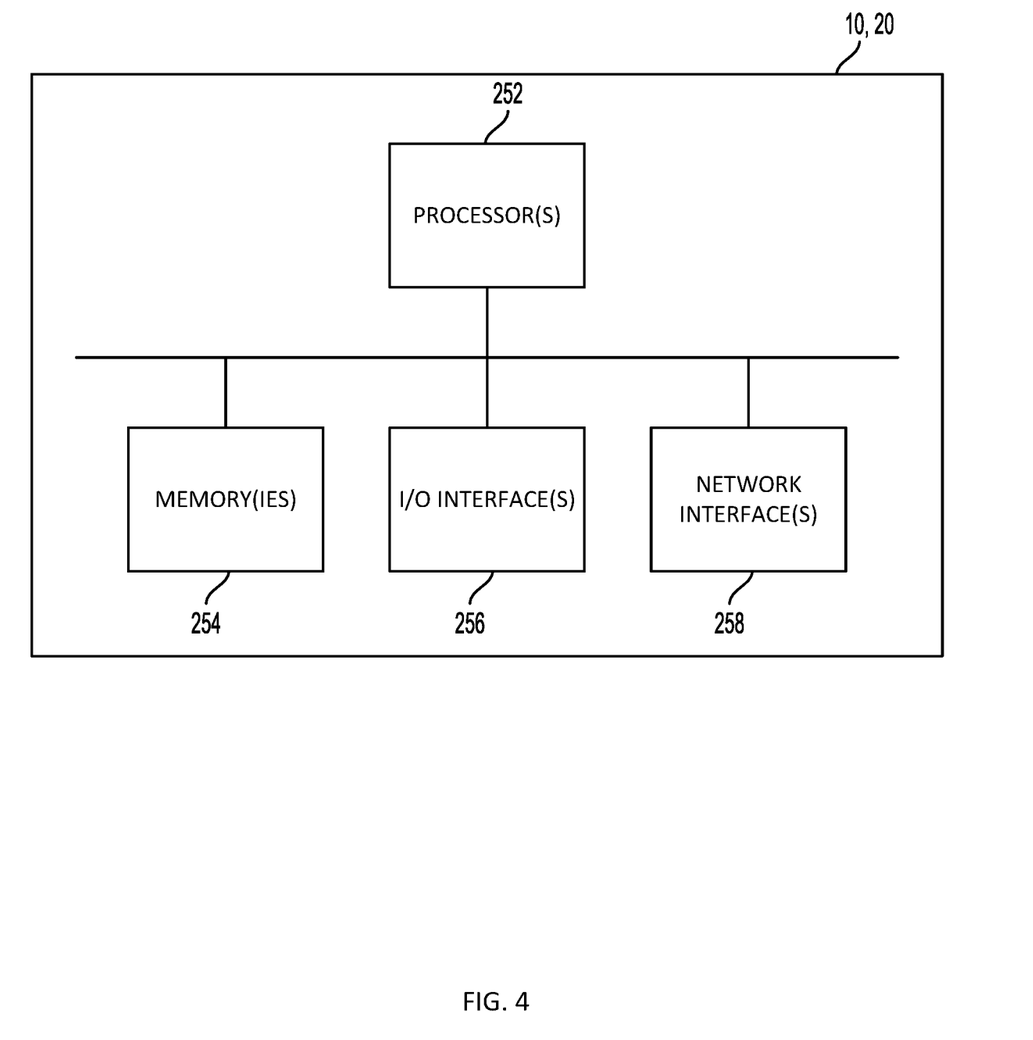
FIG. 4 shows a schematic diagram showing example devices in accordance with various aspects of the disclosure.

FIG. 4 is a schematic diagram showing aspects of an example communication system/device 10, and/or backup system/device 20. While the example in FIG. 4 shows a single device, in some embodiments, the communication device 10, 20 can include or consist of multiple devices and in some examples, can be physically and/or logically grouped as a system or any other arrangement.

Without limiting the foregoing, reference to a communication device or system 10 should not be interpreted as limited to a single device, but may include multiple devices and/or one or more systems having the same components and/or configured to perform the same functions as described with reference to a communication device 10. This applies similarly to references to a backup system or device.

In some examples, the backup system/device(s) 20 may include the same or similar components to the primary communication device(s) 10. In some examples, the backup system/device(s) 20 can be configured to perform the same function(s) as a communication device 10, or may be another instance of a primary communication device 10 configured to generate and/or receive instructions from another device or system for communicating with one or more destination(s) and/or another backup system/device 20.

In some example embodiments, communication devices 10 and/or backup device 20 may include one or more processor(s) 252 connected to one or more memory(ies) 254 or other temporary and/or persistent storage memory device(s). The processor(s) may be connected to one or more network interface(s) 258 configured to transmit and/or receive data messages over a wired (optical fiber, copper line, etc.), wireless (Wi-Fi, radio, microwave, etc.), and/or any other interface. The processor(s), network interface(s) and/or other aspects of the device(s) 10, 20 may include any suitable hardware structure for generating signals for wired or wireless transmission and/or processing received signals. The processor(s), network interface(s) and/or other aspects of the device(s) 10, 20 may include modules or may be otherwise configured to interpret, translate, encapsulate, cache, queue, re-order, encode/decode, encrypt/decrypt, or otherwise process or generate messages suitable for transmitting to the destination or between the communication device 10 and the backup device 20.

The memory(ies) 254 may be accessible by the processor(s) to access, receive and/or store data. The memory(ies) 254 may include a main memory, such as a high speed Random Access Memory (RAM), an auxiliary storage unit, such as a hard disk, flash memory, registers and/or a magnetic tape drive. The memory(ies) 254 may include any other type of memory, such as a Read-Only Memory (ROM), Erasable Programmable Read-Only Memory (EPROM), electrically-erasable programmable read-only memory (EEPROM), Ferroelectric RAM (FRAM), or optical storage media such as a Blu-ray Disc™, videodisc and a compact disc. In an embodiment, the memory may be used to buffer data and/or instructions. The processor(s) may access the memory(ies) to retrieve data or instructions.

The processor(s) 252 may include any device that can perform operations on data. Examples include a central processing unit (CPU), a front-end processor, a microprocessor, a field programmable gate array (FPGA), a reconfigurable processor, a digital signal processor, a network processor, an integrated circuit, or any other processing device and/or any combination thereof. Applications may be running on the processor and may be configured to perform various tasks including at least aspects of the methods described herein. The processor(s) may be configured to perform one or more aspects of the methods and processes described herein.

The device(s) 10, 20 may include input/output devices and/or input/output interface(s) 256 for input/output devices such as built-in or peripheral devices such as displays, touchscreens, keyboards, sensors, input mechanisms, actuators, data storage devices and the like.

Referring to FIG. 2, at 220, the communication device 10 may be optionally configured to receive, from a source, information to be communication to the destination. The information may include instructions and/or data. In some embodiments, the communication device 10 may be configured to interpret, translate, encapsulate, cache, queue, re-order, encode/decode, encrypt/decrypt, or otherwise process or generate messages suitable for transmitting to the destination or the backup device 20 based on and/or including the information received from the source.

In some embodiments, the communication device 10 may be configured to generate messages for transmitting to the destination and backup device 20 its own information (e.g. data or instructions) or information accessed or generated in conjunction with another system or device.

At 230, before sending the message to the destination, the communication device 10 can be configured to send a backup message to the backup device 20. In some examples, the backup message can include a copy of the message. For examples, the backup message can be identical copy of the message, or may additional headers or other information and/or metadata.

In some examples, the backup message may not be a copy of the message, but may include data and/or instructions which may be used by the backup 20 or other device to recreate the message or may identify the instruction, intention and/or information in the original message such that a similar message suitable for sending to the destination.

For example, when a message destined for a destination includes a trade request from client identifier A to purchase 100 shares of a stock B from venue C at price D, the backup message can be: an exact copy of the message, a message including all the details of the original message but perhaps not in the same format/encoding/etc., or a message including data which simply indicates that the original was a request from client identifier A to purchase 100 shares of stock B. In the last example, the backup message does not contain details regarding price or venue but includes enough information such that a new substitute message can be created which satisfies the intention of the original request to purchase 100 shares of stock B for a client associated with client identifier A.

In some embodiments, the backup message may include or may consist of an identifier such as a sequence number associated with the message. In some such examples, the sequence number may not contain information for recreating the message but can identify dropped or unsuccessfully transmitted message(s) should an error or transmission problem occur when the message is transmitted to the destination.

In some embodiments, the backup message can be sent to the backup device 20 over a communication link 31. In some examples, the communication link 31 may include a direct communication link such as a direct end-to-end optical fiber, copper or other physical connection to the backup system. In some examples, the communication link 31 may include a wireless communication link, a direct line of sight microwave and/or a laser communication link. In some embodiments, the communication link 31 can include any mechanism or medium for communicating data from a source device to a destination device.

In some examples, the communication link is a single or otherwise undivided or unbroken communication link between the first communication device and the backup device. For example, an optical fiber connection with no intermediate connector or network device.

In other embodiments, the communication link 31 may include one or more dedicated lines and/or networks. In some examples, the dedicated line or network may utilize or include one or more redundancy paths, devices and/or lossless failover mechanisms. The dedicated line and/or network may include a guaranteed level of service. In some embodiments, the communication link 31 may include any combination of private and/or public, wired or wireless networks.

The system 200, 10 can include a tapping device 30 for monitoring messages sent over the communication link 31. In some embodiments, the tapping device 30 can be a network tap such as a fiber optic or copper tap.

In some embodiments, the tapping device 30 may be a passive device connected to the communication link 31 which allows signals from the communication device 10 to the backup device 20 to pass through uninterrupted while monitoring the content of those signals. For example, a passive optical tap may redirect a small portion of the light signals travelling along an optical fiber connection from the communication device 10 to the backup device 20. In some examples, the tapping device 30 can include an optical tap, a copper tap or any other passive tapping device.

In some examples, the tapping device 30 can include an amplifier or can be otherwise configured to amplify the signals tapped from the communication link 31.

In some embodiments, the tapping device 30 may include a device that monitoring messages sent over the communication link by receiving signals from the communication device 10 and then generates identical signals for continuing their transmission to the backup device 20. In some examples, the tapping device 30 may be configured to allow the signals to pass through un-hindered in the event the power to the tapping device 30 is lost and/or any other failure occurs.

In some embodiments, the tapping device 30 may be positioned on the communication link proximate or relatively close to the communication device 10. In some examples, by positioning the tapping device close to the communication device 10, the transmission time of a message from the communication device to the tapping device is shorter than if the tapping device was positioned further along the communication link. For example, the tapping device can be positioned at a location on the communication link that closer to the communication device 10 than to the backup device.

In some examples, the tapping device 30 may be positioned within the first 10%, 25% or 50% of the length/distance of the communication link as measured from the communication device 10 to the backup device.

In some embodiments, the tapping device 30 may be positioned a location of the communication link which provides an acceptable latency for the system's performance requirements. In some examples, the position may be based on a determination of a maximum or range of distances derived from the speed of the communication link and a maximum or range of acceptable backup latencies.

In some embodiments, the tapping device 30 may be positioned far enough from the communication device/system 10 such that a failure of a component of the communication device/system 10 is unlikely to prevent the backup message from reaching its destination.

In another example, when a backup message is sent via a number of interconnections and/or networking devices, the tapping device may provide a higher degree of confidence if it is positioned after the last interconnection or networking device between the communication device 10 and the backup device/system.

When a backup message is sent over the communication link 31, the tapping device can tap a tap copy of the backup message as it is being transmitted along the communication link 31.

At 240, the communication device 10 can be configured to confirm a tap copy of the backup message from the tapping device. In some examples, this includes receiving a tap copy of the backup message. In some examples, the communication device 10 can be configured to verify the tap copy of the backup message. This can include verifying that the backup message has been sent over the communication link 31, verifying that the backup message has been sent without errors, and/or verifying that the backup message correctly includes a copy of the message or data/instructions for recreating a message to be sent to the destination.

In some examples, verifying the tap copy may include generating a verifying an error correction code (ECC) and/or hash of the tap copy with an ECC and/or hash of the backup message.

In some examples, the tapping device 30 or other device may be configured to verify the tap copy, and to send a confirmation signal to the communication device 10.

At 250, upon confirmation of the tap copy of the backup message, the communication device 10 can be configured to send the message to the destination. In some scenarios, by confirming that the backup message has been sent or "launched" down a dedicated link or high reliability link/network, the communication device 10 can safely assume that the backup message will be arrive at the backup device. This assumption may, in some instances, be particularly reliable for an optical or other high speed link where signals travel close to the speed of light. In order for the message to be lost, the communication device 10 would have to fail after the backup message has been launched but before the message to the destination has been sent, and the communication link 31 would have to fail after the backup message has been launched but before the backup message, potentially travelling near the speed of light, arrives at the backup device 20. In other words, in some embodiments, the transmission over the communication link 31 may be at a great enough speed that it may be assumed that once a message has been sent, there is a very small window of time during which a failure or nefarious activity can prevent message from reaching its destination.

In some embodiments, the backup device (or system) 20 may be configured to store the backup message for retrieval in the event of a failure of the communication device 10. In some embodiments, the backup device (or system) 20 may be a redundant communication device which can send the message (and/or recreate the message for sending) to the destination in the event the primary communication device 10 fails.

In some embodiments, the communication device 10 at 260 may be optionally configured to send a confirmation message to the source that the message has been delivered. This confirmation may occur after the confirmation of the tap message and/or concurrently with or after the sending of the message to the destination 250.

In some examples, the communication device 10, at 270, can be configured to receive an acknowledgement message from the backup device 20 indicating the backup message was received, stored and/or processed. In some examples, the communication device 10 may be configured to use the acknowledgement message as a confirmation of the status/health of the backup system 20 as it does not wait for the acknowledgement before sending the message to the destination.

In some examples, the communication device 10 may be configured to send backup messages to a different backup system, if an acknowledgement message has not been received from a first backup system after a threshold time.

In some instances, the systems 200 and methods 201 described herein may allow for reliable data transmission with a high degree of certainty that a message will be sent without the inherent latencies of the system described in FIG. 1.

In some embodiments, the tapping device 30 may be positioned on the communication link 31 proximate to the communication device 10. The closer the tapping device 30, the lower the transmission latency for the backup message to travel from the communication device 10 to the tapping device 30, and the lower the transmission latency for the tap copy or other signal to travel from the tapping device 30 to the communication device 10.

In an example application, the systems 200, devices, and methods 201 described herein may be used as part of a financial trading system. Trade request data may be received from a source or generated by a communication device 20 for transmission to a trade execution device (destination) at a stock exchange. Due to potentially large financial consequences if a trade request fails to be sent or is sent too late (allowing prices or liquidity to change), the system 200 may, in some examples, provide a suitable system for timely and reliable transmission of trade requests.

In some instances, embodiments of the systems, devices, and methods described herein may be used in other environments requiring high reliability and/or time critical communications. Examples include but are not limited to military, government, bank, telecom, etc. In some examples, embodiments of the systems, devices, and methods described herein may be useful for service providers to provide various service level requirements.

Figure 3:
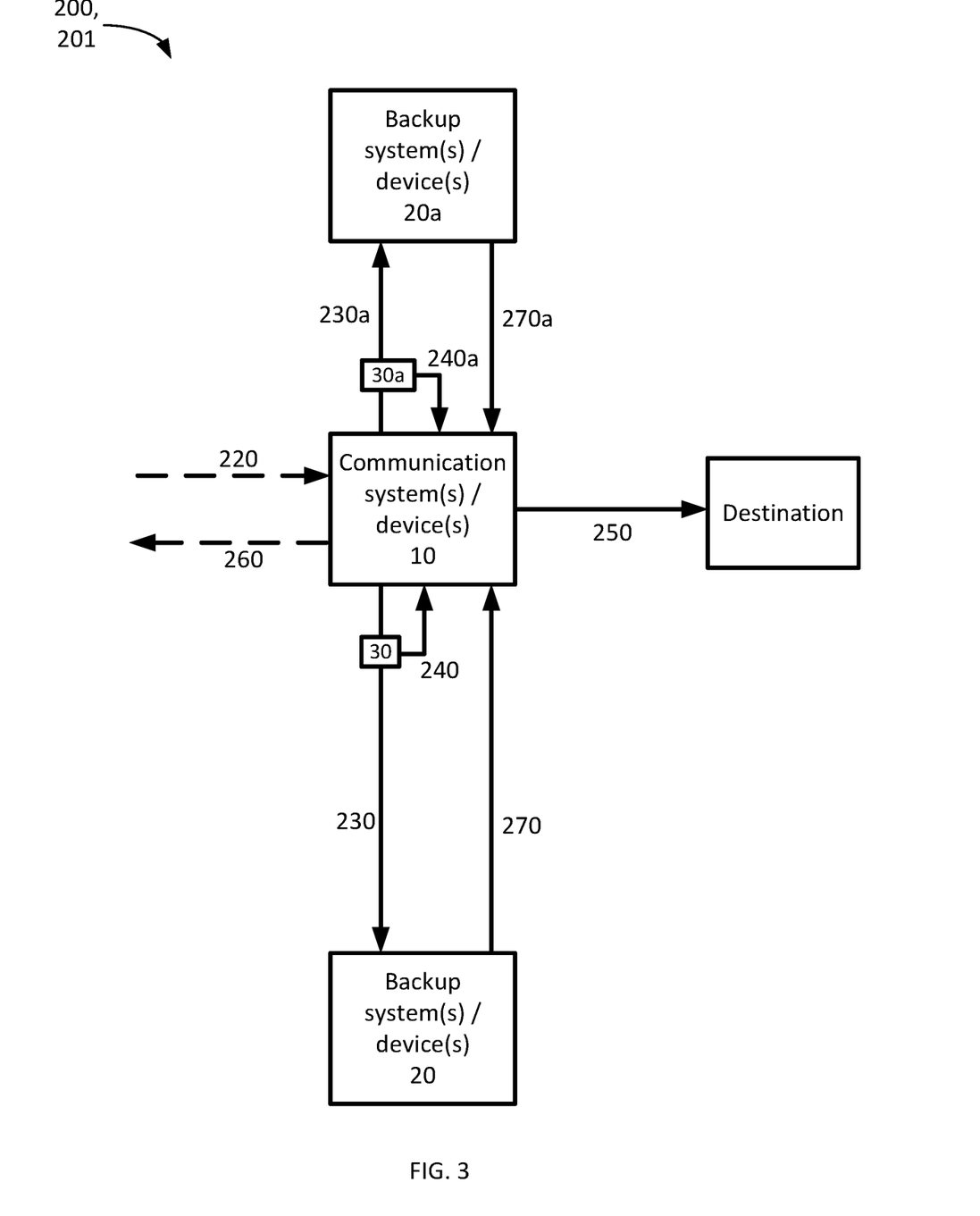

FIG. 3 shows aspects of another example system 200, and flowchart 201 illustrating another example communication process. In FIG. 3, the communication device 10 can be configured to send a backup message to both a first backup device 20 and a second backup device 20a before sending a message to the destination.

In some embodiments, the first and second backup devices 20, 20a are at different locations, and/or are located in different directions from the communication system/device 10.

In some embodiments, the communication link for sending 230 the backup message to the first backup system 20 is different from the communication link for sending 230a the backup message to the second backup system 20a. For example, the respective backup messages can be sent along different physical communication connections, sent from/via different network devices and/or in different directions. In some instances, the use of such different physical communication connections may reduce the change that both backup messages are lost.

While, FIG. 3 shows an example system 200 which utilizes two backup systems 20, 20a, in other embodiments, three, four or any number of backup systems may be used, each with their own respective taps and communication links. In some embodiments, this may create additional redundancy and/or reliability.

In some examples, the communication device 10 can be configured to send the message to the destination upon confirmation of a tap copy from at least one of the tapping devices 30, 30a. In some such examples, the system 200 and methods 201 may provide a further layer of redundancy without any additional backup delay.

In some examples, for a potentially higher degree of reliability, the communication device 10 can be configured to only send the message to the destination upon confirmation of a tap copy from both of the tapping devices 30, 30a. In embodiments having three or more backup systems, the communication device 10 can be configured to only send the message to the destination upon confirmation of a tap copy from two or more of the backup systems.

As described herein or otherwise, in some embodiments, the communication system 10 is configured to send backup messages to a subset of all available backup systems. The communication system 10 may be configured to send backup messages to additional backup system(s) when acknowledgement messages are not received within a defined threshold time.

In some embodiments as described with respect to FIG. 2 or 3, the communication system 10 may concurrently act as backup system for another system/device such as the backup devices 20, 20a.

The backup system(s) 20, 20a are configured to send an acknowledgment message to the communication system 10 upon receipt of a backup message. In some examples, these acknowledgement messages can be used by the communication system 10 as a health indicator or status check on the corresponding communication link 31 and/or backup system 20.

In some embodiments, the backup system(s) are configured to send heartbeat messages to the communication system 10. The heartbeat message can be sent periodically (e.g. every 10 ms) to the communication system 10 to act as a health indicator or status check on the corresponding communication link 31 and/or backup system 20.

In some embodiments, the heartbeat messages may only be sent when an acknowledgement message has not been sent recently or within the last heartbeat period. In other embodiments, the heartbeat messages are sent periodically irrespective of any acknowledgement messages. In some examples, the use of heartbeat messages can provide the communication system a relatively current indication of the health of the backup link(s) and/or system even if a backup message has not been sent to the backup system recently.

In some embodiments, the heartbeat messages can include a sequence number or some identifier with which the communication system 10 can determine whether a particular heartbeat message was not successfully received.

Alternatively or additionally, in some embodiments, the communication system 10 can be configured to send heartbeat messages to the backup system 20. This can cause the communication system 10 to receive tap copies of the heartbeat messages from the tap device 30, and acknowledgement heartbeat messages from the backup system 20. In some such embodiments, the heartbeat messages can provide an indication of the health/performance of the tap device 30, communication links and backup system 20.

In some embodiments, when the communication system 10 does not receive an acknowledgement or heartbeat message (originating from the backup system or as an acknowledgement of an original heartbeat message received from the communication system) within a defined time threshold (e.g. within 500 microseconds of sending a backup or original heartbeat message, or within 350 microseconds of an expected heartbeat message), a secondary or failure mode may be triggered. For example, in a secondary mode, the communication system 10 may be configured to stop sending backup messages to a primary backup system from which acknowledgement or heartbeat messages have not been received within the defined threshold, and may send all subsequent backup messages to a different backup system.

In other embodiments, when a secondary or failure mode is triggered, the communication system 10 can be configured to utilize a different backup mechanism. In some examples, the communication system can use a traditional backup mechanism which may have a longer latency and/or slower throughput than the tap mechanism described herein. For example, the communication system operating in a secondary mode may store a backup message locally or otherwise within the communication system 10.

In some embodiments, when a secondary or failure mode is triggered, the communication system/device 10 may continue to send messages to the destination despite the loss or unreliability of a backup system. In some examples, the communication system/device 10 may generate an alert or electronic message providing an indication that the system 200 is operating in a mode that cannot guarantee a recovery should a failure occur.

In some examples, the communication system(s)/devices(s) 10 can use heartbeat messages and any associated tap copies and acknowledgement heartbeat messages to monitor latencies between the transmission of a backup copy and the receipt of a tap copy or an acknowledgement message. In some embodiments, the monitoring of latencies can include using timestamps in heartbeat and/or acknowledgement messages, or by monitoring clock times of transmission or receipt of messages. In some examples, then the communication system 10 detects a monitored latency which indicates a change from a historical or expected latency, the communication system 10 can be configured to generate an alert. Such a change in latency may, in some instances, be indicative of a hardware or software problem, a change in topology, a backlog at the backup system, etc. The alert may allow for more comprehensive testing or investigation to be performed before a catastrophic problem occurs.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the claims is to be defined solely by the appended claims, giving due consideration to the doctrine of equivalents and related doctrines.

What is claimed is:

1. A communication system, the system comprising:
   a first communication device configured to communicate with a backup device and a destination;
   a first tapping device for monitoring messages sent over a first communication link between the first communication device and the backup device, the first communication link being a dedicated or high reliability link/network adapted such that the first communication device can safely assume that the backup will arrive at the backup device;
   the first communication device including at least one processor configured to:
   before sending a first message destined for the destination, send a backup message corresponding to the first message over the first communication link for backup at the backup device;
   upon confirmation of a tap copy of the backup message from the first tapping device, send the first message to the destination; and
   send a confirmation message to a source device to indicate that the first message has been delivered, the confirmation message sending after the confirmation of the tap copy of the backup message.

2. The communication system of claim 1, wherein the at least one processor is configured to: verify the tap copy before sending the first message to the destination.

3. The communication system of claim 1, wherein the backup message includes a copy of the first message.

4. The communication system of claim 1, wherein the backup message includes information that can be used to recreate the first message or create a substitute message.

5. The communication system of claim 1, wherein the communication link between the first communication device and the backup device is an undivided physical communication link.

6. The communication system of claim 1, wherein the first tapping device is positioned at a position on the communication link that is closer to the first communication device than the backup device.

7. The communication system of claim 1, wherein the at least one processor is configured to: verify a status of the backup device based on an acknowledgement message received from the backup device, the acknowledgement message indicating that the backup message was received.

8. The communication system of claim 1, comprising: a second tapping device for monitoring messages sent over a second communication link between the first communication device and a second backup device;
   wherein the at least one processor is configured to:
   before sending the first message destined for the destination, send the backup message over the second communication link; and
   upon confirmation of the tap copy from at least one of the first tapping device or the second tapping device, send the first message to the destination.

9. The communication system of claim 1, wherein the at least one processor is configured to receive heartbeat messages from the backup device.

10. The communication system of claim 1, wherein the at least one processor is configured to send heartbeat messages over the first communication link to the backup device, and to receive corresponding tap messages from the first tapping device and acknowledgement heartbeat messages from the backup device.

11. The communication system of claim 1, wherein the at least one processor is configured to trigger a secondary backup mode when an acknowledgement message or heartbeat message is not received within a defined time threshold.

12. The communication system of claim 11, wherein in a secondary backup mode, the at least one processor is configured to send the backup message to second backup device.

13. A communication device comprising:
at least one processor configured to:
before sending a first message destined for a destination, send a backup message corresponding to the first message over a communication link for backup at the backup device, the communication link being a dedicated or high reliability link/network adapted such that the communication device can safely assume that the backup will arrive at the backup device;
upon confirmation of a tap copy of the backup message from a tapping device on the communication link, send the first message to the destination; and
sending a confirmation message to a source device to indicate that the first message has been delivered, the confirmation message sending after the confirmation of the tap copy of the backup message.

14. The communication device of claim 13, wherein the at least one processor is configured to: verify the tap copy before sending the first message to the destination.

15. The communication device of claim 13, wherein the backup message includes a copy of the first message.

16. The communication device of claim 13, wherein the backup message includes information that can be used to recreate the first message or create a substitute message.

17. The communication device of claim 13, wherein the communication link between the first communication device and the backup device is an undivided physical communication link.

18. The communication device of claim 13, wherein the tapping device is positioned at a position on the communication link that is closer to the first communication device than the backup device.

19. The communication device of claim 13, wherein the at least one processor is configured to: verify a status of the backup device based on an acknowledgement message received from the backup device, the acknowledgement message indicating that the backup message was received.

20. The communication device of claim 13 wherein the at least one processor is configured to:
before sending the first message destined for the destination, send the backup message over a second communication link for backup at a second backup device; and
upon confirmation of the tap copy from at least one of the tapping device on the communication link, or a second tapping device on the second communication link, send the first message to the destination.

21. The communication device of claim 13, wherein the at least one processor is configured to receive heartbeat messages from the backup device.

22. The communication device of claim 13, wherein the at least one processor is configured to send heartbeat messages over the communication link to the backup device, and to receive corresponding tap messages from the tapping device and acknowledgement heartbeat messages from the backup device.

23. The communication device of claim 13, wherein the at least one processor is configured to trigger a secondary backup mode when an acknowledgement message or heartbeat message is not received within a defined time threshold.

24. The communication device of claim 23, wherein in a secondary backup mode, the at least one processor is configured to send the backup message to the second backup device.

25. A communication method comprising:
before sending, from a communication device, a first message destined for a destination, sending a backup message corresponding to the first message from the communication device to a backup device over a communication link being a dedicated or high reliability link/network adapted such that the communication device can safely assume that the backup will arrive at the backup device;
upon confirmation of a tap copy of the backup message from a passive tapping device on the communication link, sending the first message to the destination; and
sending a confirmation message to a source device to indicate that the first message has been delivered, the confirmation message sending after the confirmation of the tap copy of the backup message.

26. The method of claim 25, comprising verifying the tap copy before sending the first message to the destination.

27. The method of claim 25, wherein the backup message includes a copy of the first message.

28. The method of claim 25, wherein the backup message includes information that can be used to recreate the first message or create a substitute message.

29. The method of claim 25, wherein the communication link between the first communication device and the backup device is an undivided physical communication link.

30. The method of claim 25, wherein the first passive tapping device is positioned at a position on the communication link that is closer to the first communication device than the backup device.

31. The method of claim 25, comprising verifying a status of the backup device based on an acknowledgement message received from the backup device, the acknowledgement message indicating that the backup message was received.

32. The method of claim 25 comprising: before sending the first message destined for the destination, sending the backup message over a second communication link; and
upon confirmation of a tap copy from at least one of the tapping device on the communication link or a second tapping device on the second communication link, send the first message to the destination.

33. The method of claim 25, comprising receiving heartbeat messages from the backup device.

34. The method of claim 25, comprising: sending heartbeat messages over the communication link to the backup device; and receiving corresponding tap messages from the first tapping device and acknowledgement heartbeat messages from the backup device.

35. The method of claim 25, comprising: triggering a secondary backup mode when an acknowledgement message or heartbeat message is not received within a defined time threshold.

36. The method of claim 35, wherein triggering the secondary backup mode, comprises sending the backup message to the second backup device.

37. The system of claim 1, wherein the first tapping device allows signals sent from the first communication device to the backup device to pass uninterrupted while monitoring the messages sent over the first communication link between the first communication device and the backup device.

\* \* \* \* \*